(12) United States Patent
Anderson et al.

(10) Patent No.: US 7,131,533 B2
(45) Date of Patent: Nov. 7, 2006

(54) EYEGLASS PROTECTIVE DEVICE

(76) Inventors: Daniel Bruce Anderson, 14800 Scandia Trail, Scandia, MN (US) 55073; Sandra Sharon Anderson, 14800 Scandia Trail, Scandia, MN (US) 55073

( * ) Notice: Subject to any disclaimer, the term of this patent is extended or adjusted under 35 U.S.C. 154(b) by 247 days.

(21) Appl. No.: 09/805,275

(22) Filed: Mar. 13, 2001

(65) Prior Publication Data

US 2002/0125148 A1 Sep. 12, 2002

Related U.S. Application Data

(60) Provisional application No. 60/188,913, filed on Mar. 13, 2000.

(51) Int. Cl.
*A45C 11/04* (2006.01)
(52) U.S. Cl. .................................................. 206/5
(58) Field of Classification Search ............... 206/5, 206/806; 24/36; 224/665, 191, 257, 615, 224/623; 383/43, 75; 150/154; 351/123, 351/156–158
See application file for complete search history.

(56) References Cited

U.S. PATENT DOCUMENTS

| 835,673 | A | * | 11/1906 | Fross | ........................ 383/73 |
| 1,740,134 | A | * | 12/1929 | Winston | ........................ 206/5 |
| 1,748,430 | A | * | 2/1930 | Stringham | ..................... 24/3.8 |
| 2,125,354 | A | * | 8/1938 | Meier | ........................ 383/43 |
| D168,138 | S | * | 11/1952 | Baratelli | ...................... D3/265 |
| 2,903,125 | A | * | 9/1959 | Monroe | ........................ 206/5 |
| 2,942,724 | A | * | 6/1960 | Hueber et al. | ................. 206/5 |
| 3,819,033 | A | * | 6/1974 | Hueber | ........................ 206/5 |
| 4,290,522 | A | * | 9/1981 | Takasaki | ....................... 206/5 |
| 4,863,013 | A | * | 9/1989 | Eastman | ..................... 206/278 |
| 4,953,695 | A | * | 9/1990 | Tallman | ........................ 206/5 |
| 5,014,846 | A | * | 5/1991 | Walker et al. | ............. 150/154 |
| 5,032,019 | A | * | 7/1991 | Burchett | ........................ 206/5 |
| 5,102,216 | A | * | 4/1992 | Mitchell | ........................ 206/5 |
| 5,151,778 | A | * | 9/1992 | Conley | ...................... 351/156 |
| 5,513,744 | A | * | 5/1996 | Yabarra | ........................ 206/5 |
| 5,553,321 | A | * | 9/1996 | Cassel | ......................... 206/5 |
| 5,593,024 | A | * | 1/1997 | Seiler | ........................ 206/5 |
| 5,706,935 | A | * | 1/1998 | Lorton | ........................ 206/38 |
| 5,735,393 | A | * | 4/1998 | Shiue et al. | .................. 206/5 |
| 5,816,464 | A | * | 10/1998 | Seiler | ........................ 224/615 |

FOREIGN PATENT DOCUMENTS

JP 10-248619 * 10/1998

* cited by examiner

*Primary Examiner*—Luan K. Bui
(74) *Attorney, Agent, or Firm*—Skinner and Associates

(57) ABSTRACT

An eyeglass protective device, comprising a body portion with an edge. The edge defines an opening through which a pair of eyeglasses may be inserted into the body portion. The body portion protects the eyeglass lenses. An eyeglass bow is accessible when the eyeglasses are in the body portion and may be used to hang the eyeglasses. The body portion is formed from a cloth-like material, is stretchable, is adapted to snugly fit around said eyeglasses, and is adapted for cleaning eyeglass lenses. The body portion has a bow aperture in a predetermined position, wherein an eyeglass bow may extend through the bow aperture. The device may be used for other personal items such as cell phones.

12 Claims, 3 Drawing Sheets

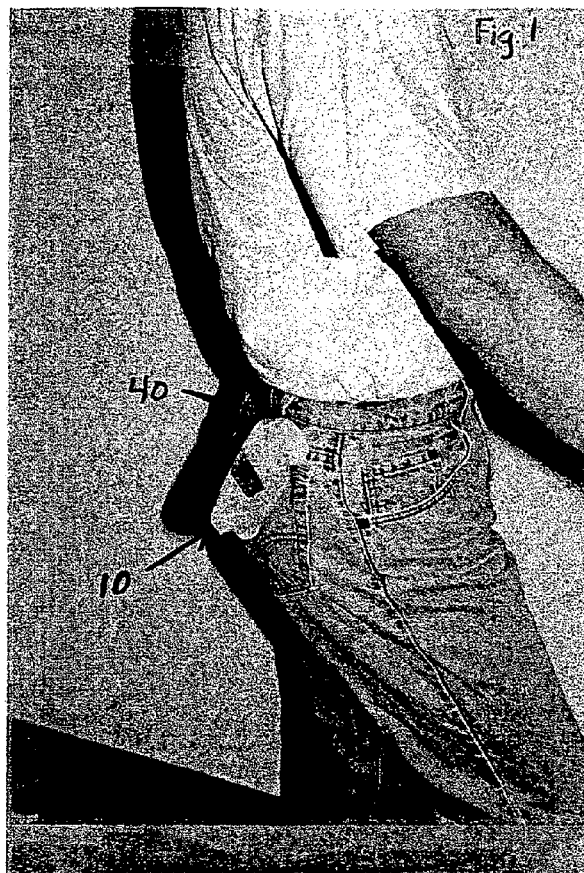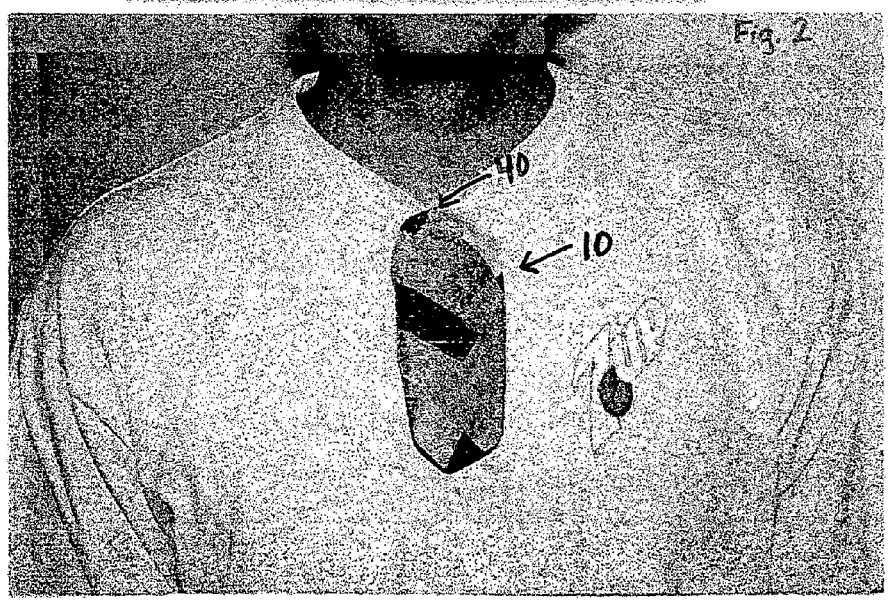

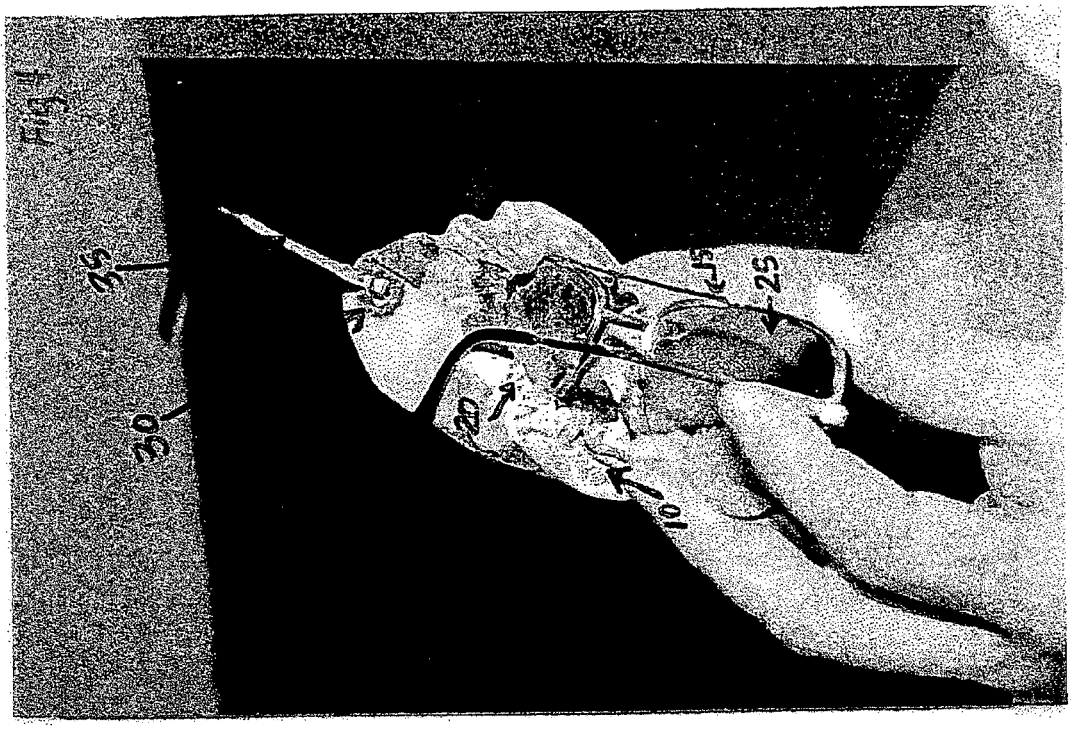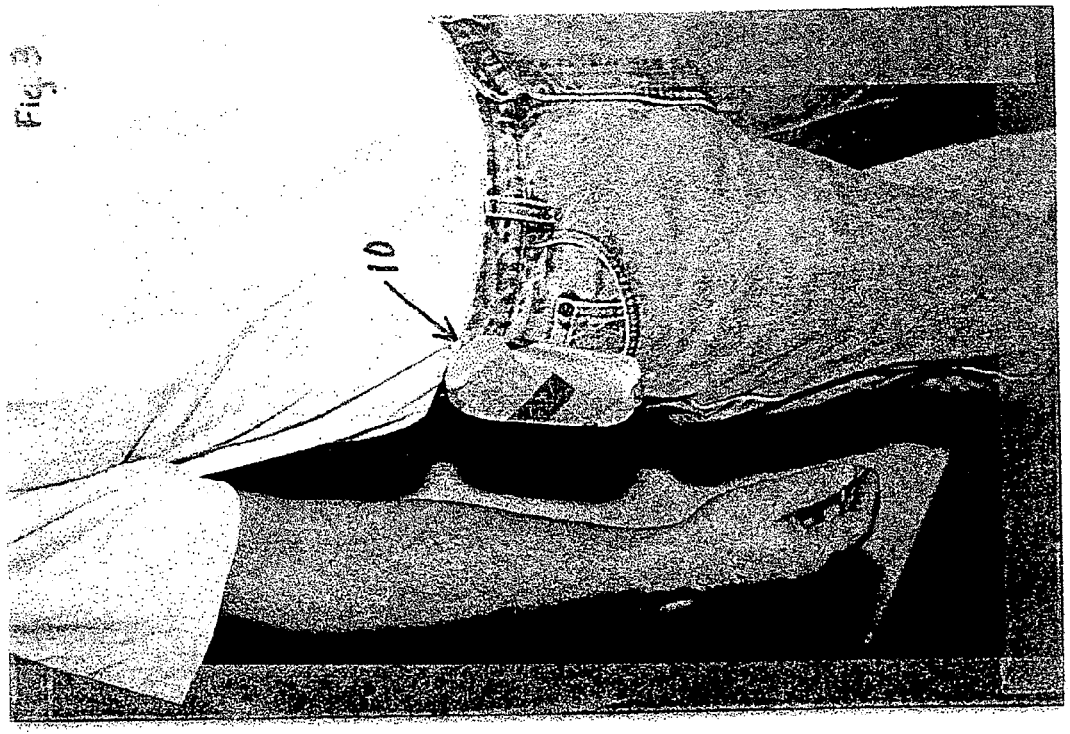

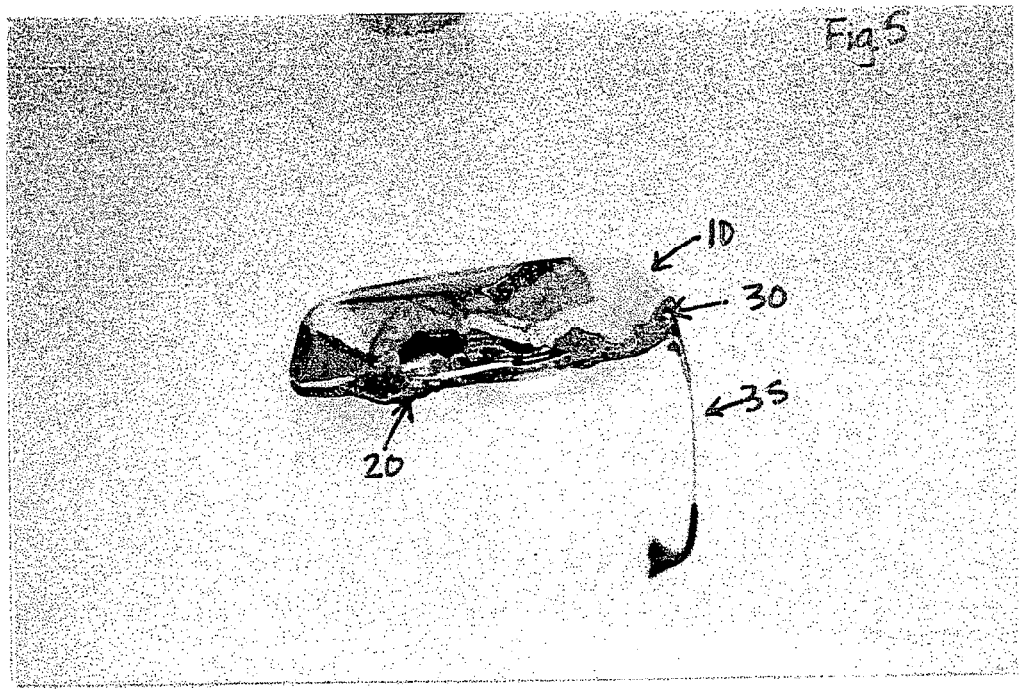
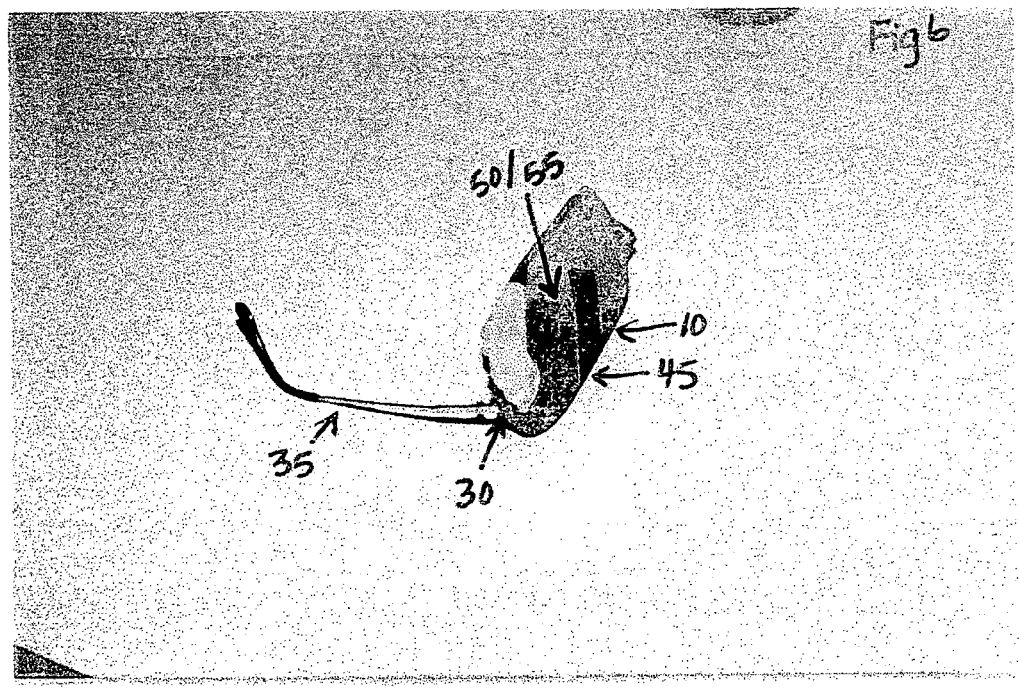

EYEGLASS PROTECTIVE DEVICE

CROSS-REFERENCE TO RELATED APPLICATIONS, IF ANY

This application claims the benefit under 35 U.S.C. §119(e) of co-pending provisional application Serial No. 60/188,913, filed Mar. 13, 2000, which is hereby incorporated by reference.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to protecting, carrying and cleaning any eyewear or other person items such as cell phones with a cover that is lightweight cloth, and allows the eyewear or items, themselves, to act as the attachment device to any article of clothing. More particularly, the invention relates to an all-in-one device that allows the eyewear user to keep their glasses, sunglasses or the like protected, cleaned and carried without any cumbersome cases, clips or cleaning devices other that this cover. The invention has particular utility in preventing scratches and foreign substances from appearing on the lenses or other surfaces, along with the ability to clean those lenses or surfaces should they get dirty or smudged.

2. Background Information

The state of the art includes various devices and methods for protecting, carrying, and cleaning eyewear. Known art devices and methods are believed to have significant limitations and shortcomings. Specifically, eyewear cases tend to be heavy and cumbersome, so they are generally not convenient to be carried to outdoor events. Whether someone needs to wear glasses to see an outdoor concert better, or they are wearing expensive sunglasses during outdoor activities, these eyewear need to be protected after the concert is over or when the sun goes down to eliminate the possibility of scratches or damage to the lenses. Other eyewear cases may be lightweight, but are not easily attachable to clothing, or purse-like items, without the use of clips or ties, that make carrying of them very cumbersome and unfashionable. Hard glasses cases do not clean the lenses, so a cleaning cloth must also be carried. Some soft glasses cases are made for cleaning of the lenses, but still have the problem of carrying them easily with glasses in them.

Since people are outdoors more in the summer months, and the amount of sunshine is the greatest, there is a need for eye protection from the sun. The best protection tends to come from the more expensive sunglasses, which are costly to replace. Because the amount of clothing worn in the summer is minimal, people do not like to carry cumbersome cases, and will many times hook a bow of the sunglasses over a shirt collar, in a belt loop, or in the waistband of a swim suit to keep the sunglasses somewhat protected and attached to their body when they are out of the sun. However, the glasses tend to slip out of the shirt collar and fall on the floor when bending over, or rub up against a rough surface when hooked into pants or shorts, and potentially damage the lenses.

Significant features of the invention include: 1) a bow-through hole or slit to allow the bow to be fed through the soft cover to act as a hanger; 2) elastic or tieable band to keep cover tight and fashionable around the eyewear, which also makes the cover a great tool as a premium product or message/logo carrier; 3) soft, lightweight cloth that is easily carried in any clothing without bulkiness that can also be used to clean lenses of eyewear; 4) Available in any multiple sizes for any common eyewear, and each size has stretchability to fit over many sizes of eyewear.

The present invention provides an eyeglass protective device which is believed to constitute an improvement over the known art.

BRIEF SUMMARY OF THE INVENTION

A soft cover (also referred to as "cover") for any eyewear, including, but not limited to, sunglasses, spectacles, safety glasses, sport glasses, and any other eyewear (all referred to as "glasses") or personal items such as cell or mobile phones that fits snugly over the top and around the lenses or items to form a stylish, protective, and potential message carrying and cleaning cover. The cover not only acts as a protector from scratches, dirt, water spray, dust or other foreign substances or damage that can affect the clarity of the wearer's view through the lenses of said glasses, but it offers unique features that allow the glasses to be hung from various pieces of clothing or other items without using any other means than the glasses themselves, and it can be made from the same material that is suitable for cleaning glasses. It may also be used as a message carrier for a company logo or any other message by printing or embroidering on the same cover.

The cover fits easily over the glasses and wraps around the back of the lenses with a band. The band can be made of elastic or any other stretchy material so that it can be fitted around the lenses like a shower cap, or it can be made of string, cord, or any other material that can be tied around the back of the lenses. The unique bow-through hole or slit in either one or both ends of the soft cover allows one of the bows to be fed through the cover so that the eyewear can be hung by the bow from any piece of clothing, purse, luggage, the inside of an automobile, or any conceivable place that the wearer would want to hang such eyewear without the worry of them being scratched or dirtied.

When the covered glasses are hung or laid down so that they are touching other material, such as hanging from the neck of a shirt or laying on the dashboard of a car, the soft cover also provides another benefit by creating friction against the other material so that the glasses are less likely to fall or slide from where they are placed, and, consequently, can help to avoid possible scratches or damage.

The elastic or tieable band also offers a unique feature by allowing the lenses to be covered easily (even without using the bow-through hole or slit) so that they can be quickly thrown on the dashboard of a car or in a purse without the worry of scratching or dirtying. Because of the lightweight construction and foldability of the cover, it can be taken anywhere easily in a pocket, shoe, purse, or any other small area without the cumbersome features of most eyeglass cases, and, therefore, has even added benefits to the outdoor enthusiast.

The features, benefits and objects of this invention will become clear to those skilled in the art by reference to the following description, claims, if any, and drawings.

BRIEF DESCRIPTION OF THE SEVERAL VIEWS OF THE DRAWING

FIG. 1 illustrates the protective device of the present invention covering a pair of glasses hanging on a belt loop.

FIG. 2 illustrates the protective device covering a pair of glasses hanging on a shirt collar.

FIG. 3 illustrates the protective device covering a pair of glasses hanging on the waistband of trousers.

FIG. 4 is the back view of the protective device being installed over a pair of glasses, wherein the bow of the glasses extends through the hole and the elastic band fits around the glasses.

FIG. 5 is a back view of the protective device after being fit around the glasses and with the bow of the glasses fed through an aperture in the device.

FIG. 6 is a front view of the protective device after being fit around the glasses and with the bow of the glasses fed through an aperture in the device.

DETAILED DESCRIPTION

Referring to FIGS. 1–4, the invention is a cover which protects eyewear. Although the invention is described below in connection with eyewear, the invention may be used for personal items carried by a user such as cell or portable phones.

The protective device or soft cover 10 preferably includes an elastic or tieable band 20 adapted to fit around eyewear 15 for lens 25 protection, and a hole/slit or other aperture 30 through which the bow 35 of the eyewear 15 may extend to function as a hanger 40 on clothing or other items as illustrated in FIGS. 1–3.

The cover 10 is preferably made from cloth materials conducive to cleaning the lenses. The cover 10 can be manufactured in any size that is needed for any type of eyewear, and is preferably made from a material that is also somewhat stretchy to aid in the snugness of the material.

The cover 10 fits easily over the glasses 15 and wraps around the back of the lenses 25 with a band. The band 20 is made of elastic or any other stretchy material so that it can be fitted around the lenses 25 like a shower cap, or it can be made of string, cord, or any other material that can be tied around the back of the lenses 25.

When the covered glasses 15 are hung or laid down so that they are touching other material, such as hanging from the neck of a shirt or laying on the dashboard of a car, the soft cover 10 also provides another benefit by creating friction against the other material so that the glasses 15 are less likely to fall or slide from where they are placed, and, consequently, can help to avoid possible scratches or damage.

The bow-through hole or slit 30 in either one or both ends of the soft cover 10 allows one of the bows 35 to be fed through the cover 10 so that the eyewear 15 can be hung by the bow 35 from any piece of clothing, purse, luggage, the inside of an automobile, or any conceivable place that the wearer would want to hang such eyewear 15 without the worry of them being scratched or dirtied.

The elastic or tieable band 20 also allows the lenses 25 to be covered easily (even without using the bow-through hole or slit 30) so that they can be quickly thrown on the dashboard of a car or in a purse without the worry of scratching or dirtying. Because of the lightweight construction and foldability of the cover 10, it can be taken anywhere easily in a pocket, shoe, purse, or any other small area without the cumbersome features of most eyeglass cases, and, therefore, has even added benefits to the outdoor enthusiast.

After being properly placed on the eyewear 15, the cover 10 can create a fashionable look and snug fit 45 with any cloth design 50 or by printing a message on the face of the cover 55.

In summary, significant features of the invention include, but are not limited to: (1) a bow-through hole or slit 30 to allow the bow 35 to be fed through the soft cover 10 to act as a hanger; (2) elastic or tieable band 20 to keep cover tight and fashionable around the eyewear 15, which also makes the cover 10 a great tool as a premium product or message/logo carrier; (3) soft, lightweight cloth that is easily carried in any clothing without bulkiness that can also be used to clean lenses 25 of eyewear 15; and (4) it is configurable in any multiple sizes for any common eyewear 15, and each size has stretchability to fit over many sizes of eyewear 15.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A protective eyeglasses system, comprising eyeglasses and a cover, the eyeglasses including a pair of connected lenses and a pair of bows connected to the lenses, the cover including a body portion with an edge, said edge defining an ingress/egress opening which is centrally disposed in said body portion, and which is adapted for insertion and removal of eyeglasses relative to an interior pouch defined by the body portion, the protective device further consisting of a bow aperture which is disposed in said body portion at an end thereof adjacent the ingress/egress opening, and which is adapted for complete extension therethrough of the bow of the eyeglasses to the exterior of the body portion, while the remainder of the eyeglasses are disposed in the interior pouch, whereby said body portion protects the eyeglasses and whereby an entire bow of the eyeglasses is accessible on the exterior of the body portion for hanging the eyeglasses and whereby the body portion protects the eyeglasses lens and one bow.

2. The eyeglass protective system of claim 1, wherein said body portion is formed from a cloth-like material.

3. The eyeglass protective system of claim 2, wherein said cloth-like material is stretchable and is adapted to snugly fit around said eyeglasses.

4. The eyeglass protective system of claim 2, wherein said cloth-like material is adapted for cleaning eyeglass lenses.

5. The eyeglass protective system of claim 1, wherein said body portion has a lengthwise dimension with opposing end portions and a widthwise dimension which is relatively less than said lengthwise dimension, and wherein said ingress/egress opening is centrally disposed with respect to said lengthwise and widthwise dimensions of said body portion and has a predetermined area, and wherein said bow aperture is disposed in a predetermined position proximate one end portion of said body portion and has a predetermined area substantially less than said predetermined area of said ingress/egress opening such that only the bow can extend through it.

6. The eyeglass protective system of claim 1, wherein said edge includes means for drawing said body portion snugly around said eyeglasses.

7. The eyeglass protective system of claim 6, wherein said means includes an elastic band.

8. The eyeglass protective system of claim 6, wherein said means for drawing said body portion snugly around said eyeglasses includes a single draw band disposed about said ingress/egress opening.

9. The eyeglass protective system of claim 1, wherein said body portion is pouch-like and has a display portion when covering said eyeglasses.

10. The eyeglass protective device of claim 9, wherein said display portion includes an aesthetic design.

11. The eyeglass protective system of claim 9, wherein said display portion includes promotional material.

12. A flexible, portable, protective device for eyeglasses having a pair of lenses and a pair of bows, comprising:
 (a) a body portion constructed of a stretchable, cloth-like material configured in a pouch configuration, said pouch body portion being constructed of a single, unitary piece of material adapted to wrap around eyeglasses and having an interior pouch and an exterior surface, the material having a single circumferential edge defining a single ingress/egress opening in said pouch adapted for insertion and removal of the eyeglasses into and from interior of the body portion, the body portion having a substantially oval configuration with a lengthwise dimension with opposing end portions and a widthwise dimension which is relatively less than said lengthwise dimension, said ingress/egress opening being centrally disposed with respect to said lengthwise and widthwise dimensions of said body portion and having a predetermined area;
 (b) an elastic band disposed about said single edge for permitting increasing the diameter of said ingress/egress opening for insertion of the eyeglasses into the pouch interior and for reducing the diameter of the ingress/egress opening after insertion; and
 (c) a single bow aperture disposed in a predetermined position in said body portion proximate one end portion of said body portion, said bow aperture having a predetermined area which is substantially less than said predetermined area of said ingress/egress opening such that only the bow can extend through it, adapted so that, when the glasses are disposed in said body portion interior, one said eyeglass bow extends through said bow aperture to the exterior of the body portion, while the remainder of the eyeglasses are disposed in the interior pouch, whereby said body portion protects the eyeglass lenses and wherein the extended bow of the eyeglasses are accessible and wherein said extended bow may be used to hang the eyeglasses on an external surface.

* * * * *